E. J. Toof,
Comb Cleaner.
Nº 77,416.   Patented Apr. 28, 1868.

Witnesses:
R. D. O. Smith
Thos. J. Parker

Inventor:
E. J. Toof
by
Coburn & Maus
attorneys

United States Patent Office.

EDWIN J. TOOF, OF FORT MADISON, IOWA.

Letters Patent No. 77,416, dated April 28, 1868; antedated April 17, 1868.

IMPROVEMENT IN COMB-CLEANERS.

*The Schedule referred to in these Letters Patent and making part of the same.*

TO ALL WHOM IT MAY CONCERN:

Be it known that I, EDWIN J. TOOF, of Fort Madison, in the county of Lee, and State of Iowa, have invented a new and useful Device for Cleaning Combs; and I do hereby declare and make known that the following is a full, clear, and exact description of the same, reference being had to the accompanying drawings, and the letters and figures marked thereon, which form part of this specification.

My invention consists in securing, in a suitable head, a series of thin elastic strips or fingers, of brass, or any other suitable material, converging towards a centre, which fingers may be readily passed between the teeth of a comb, and, by pressing upon the said teeth, will effectually clean the same from all impurities, as desired.

At the opposite end of the head there may be inserted a block of rubber or a short brush, which may be used to clean the finger-nails, when said device is used separately, and may be carried in the pocket.

To enable those skilled in the art to understand how to construct and use my invention, I will proceed to describe the same with particularity, making reference in so doing to the aforesaid drawings, in which—

Similar letters of reference denote the same parts of my invention in the different figures.

A represents a suitable head or socket, in or to which one end of a series of thin elastic strips of metal, or other suitable material, marked a, is secured or attached in any suitable manner, at such distances apart as will allow the teeth of a comb to pass through between.

B represents a piece of rubber or a short brush, which may be secured at the opposite end of the head A, for the purpose and under the circumstances before mentioned, but it is not a necessary part or appendage of my invention.

Figure 1:
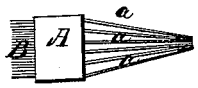
Figure 1 represents a top view of my invention.
Figure 2:
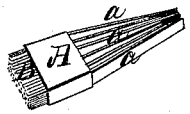
Figure 2 is a perspective view of the same.
Figure 3:
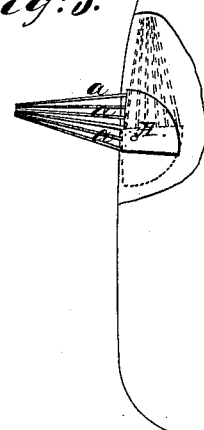
Figure 3 represents said device as being attached to a hair-brush.

If desired, said device with or without a brush, B, may be attached to a hair-brush in any suitable manner, arranged in a mortise or recess in the side of the handle or brush, or in the end, so as to be turned or pressed out when desired for use, as shown in fig. 3, or in any other suitable manner or position.

The object of making said elastic strips converging, as shown, is to adapt one device to combs of different sizes, and with teeth of different sizes, and placed at different distances apart, which cannot be done with parallel teeth.

Having described the nature, construction, and operation of my invention, I will specify what I claim, and desire to secure by Letters Patent.

I claim the arrangement of converging elastic strips a with a head, A, whether said head be provided with a brush, B, or not, as and for the purposes specified.

E. J. TOOF.

Witnesses:
W. E. MARRS,
E. C. BEALS.